Oct. 9, 1962     E. T. WHEELER     3,057,285
VENTILATING FASTENER FOR FASTENING WEATHER-PROTECTING
BOARDS TO WALLS
Filed June 13, 1960

INVENTOR.
EVERETT T. WHEELER
BY
Porter, Chittick + Russell
ATTORNEYS

United States Patent Office 3,057,285
Patented Oct. 9, 1962

3,057,285
VENTILATING FASTENER FOR FASTENING
WEATHER-PROTECTING BOARDS TO WALLS
Everett T. Wheeler, 102 W. Emerson St.,
Melrose 76, Mass.
Filed June 13, 1960, Ser. No. 35,530
9 Claims. (Cl. 98—37)

This invention relates to a ventilating weather-board fastener for attaching weather boards and other materials to walls while at the same time providing adequate ventilation for the hollow or insulated interiors of these walls.

It is commonly known that moisture vapor condenses within and seeps through the walls and often causes severe rotting and decay on both sides of the common wall. This insidious moisture is also a major cause for blistering or peeling of paint on both exterior sides of the hollow wall. If these conditions prevail, replacement and repairs of walls and studs are often costly.

To prevent this, ventilating devices have been used to permit breathing and evaporation of moisture within walls. However, devices of this sort have proved unsatisfactory for several reasons. They are intended for localized application instead of overall application as intended for use of this invention. Apertures have been placed in the walls, but they are in addition to nails or fasteners and have proved expensive and time consuming due to the necessity of drilling separate holes.

An object of this invention is to provide a weather-board fastener which also acts as a vent, thus eliminating the separate use of nails for weather boards and separate vent tubes which do not act as fasteners.

According to the present invention, the nail fastener comprises a shank adapted to extend through the weather boards and sheathing into the hollow wall and a head adapted to seat on the outside of the weather boards. The shank of the fastener has a hollow core throughout its length and continuing through the center of the head, to afford a vent from the interior of the hollow wall to the outside atmosphere. The fastener has a removable point at one end of the shank so that it can be driven through the weather boards without first drilling a hole, by the repeated blows of a hammer. The removable point may now be removed by the simple insertion of a rod of reduced diameter through the aperture in the flanged head and down through the hollow shank of the fastener until it engages the post or shank part of the point. The point is then easily knocked out or pushed free from its connection with the hollow shank of the fastener, thus dropping into the void between the walls. As may be readily seen with the point no longer attached to the fastener, the hollow shank and apertured head permit the free exit of moisture vapor from the inside of the hollow wall to the outside atmosphere.

Another object of this invention is to provide a device which can be manufactured at low cost by simple machining operations to serve both as a weather-board nail and as a vent. My invention permits a myriad of small openings blanketing the entire wall area of a building, as provided by the many fasteners that must be used to retain weather boards on the structure, thus attaining true wall ventilation.

A further object of this invention is to provide a vent device that is permanently installed and will remain firmly seated in the aperture.

Other objects, advantages, and features of this invention will be more clearly understood from the following detailed description, and from the accompanying drawings in which.

Figure 1:
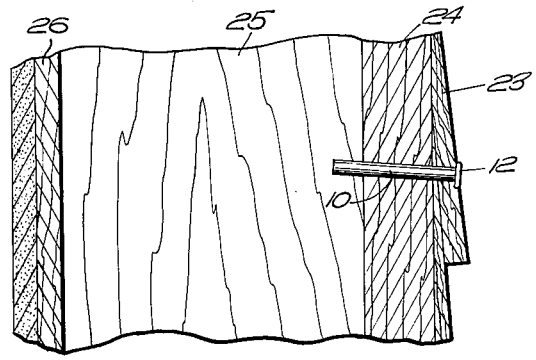
FIG. 1 is a vertical sectional view through the wall of a typical frame building having a common exterior siding and showing the ventilating weather-board fastener installed.
Figure 6:
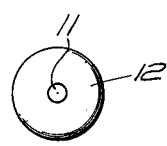
FIG. 6 is an end view showing the apertured flanged head of the nail or fastener and its operation, as shown in FIG. 4.

Ventilating devices are usually used in frame buildings constructed of wood, but may be used in buildings made of other materials, or combinations of other materials.

As shown in the drawings, this ventilating fastener comprises a longitudinal shank member 10 of suitable metal, having the longitudinal hollow core 11, and flanged head 12 with center aperture, connecting hollow core 11, at its outer end, and a removable pointed end 15, in turn provided with a shoulder 17 and a shank 16 of reduced diameter which inserts into hollow core 11 of the longitudinal shank member 10 at its inner or opposite end, so that the shoulder 17 is flush to the outer shell or casing of hollow shank member 10.

FIG. 1 shows a cross section of the typical hollow building wall with the outer covering 23, usually clapboards or shingles and the sheathing 24, usually constructed of wood. 26 represents the inner wall on the inside of said hollow wall; however, plaster and lath is the most common. The interior of hollow 25 inside said wall is the area to be ventilated, by this device.

The said device is inserted into the wall, preferably by repeated blows from a hammer. The device is preferably driven in at an upward incline from the outer wall 23 as to prevent water such as rain from readily entering the hollow area 25 in the wall. After the device is driven in, a rod of reduced diameter and suitable length is inserted in the hollow shank 11 from the outside through the flanged apertured head 12. This rod is then hammered or forced in until the pointed end 15 is forced or knocked out by pressure of the rod against the shank 16. After the point has been removed, it drops harmlessly into the hollow wall area 25 between the walls. The rod is then removed, leaving the longitudinal hollow shank and apertured head free from obstruction.

Figure 7:
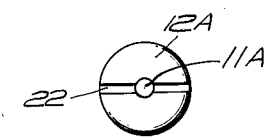
FIG. 7 is an end view of the apertured flanged head and slot of the modified screw device, as shown in FIG. 5.
Figure 2:
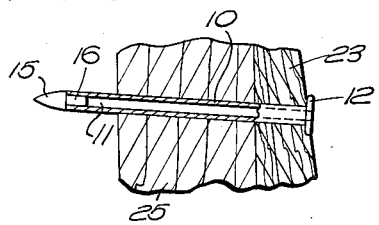
FIG. 2 is an enlarged vertical sectional view showing the device installed in a wall and with the removable "knock-out" point still in position in the vented hollow shank.
Figure 3:
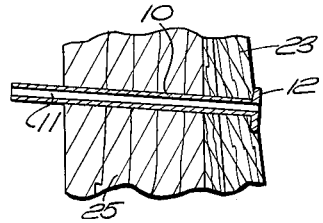
FIG. 3 is a similar view showing the device after the "knock-out" point has been removed, to allow ventilation through the hollow shank and apertured head.
Figure 4:
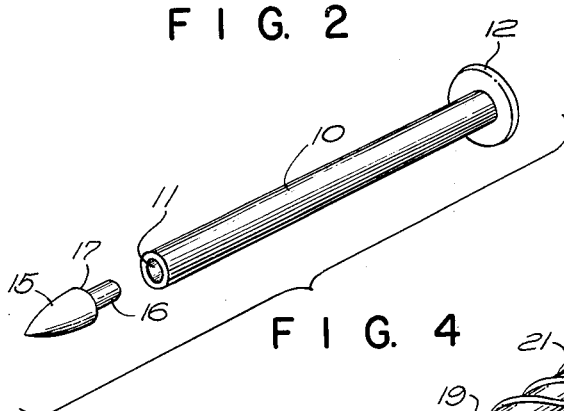
FIG. 4 is an exploded perspective of this device showing the parts in separated relationship.
Figure 5:
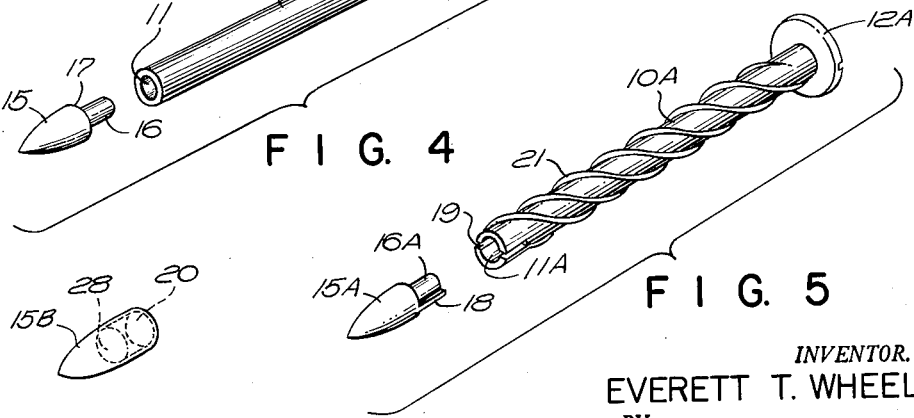
FIG. 5 is an exploded view showing a modification of this device provided with screw threads to enable it to be inserted like a screw.

A modification of this device is shown in FIG. 5 which is similar to that shown in FIG. 4 with a few exceptions. Continuous helical ribs or threads 21 are provided on the outer surface of the longitudinal shank member 10A to permit this device to be screwed or also driven by a hammer into a wall. A suitable slot such as 22 in FIG. 7 is provided to permit this device to be screwed in by a screwdriver or similar tool. Slots or indentations 19 are provided on the inner end of the hollow shank member 10A, to be engaged by keys 18 on the outer surface of the engaging shank on point 15A, to insure that the removable point 15A will integrally rotate with the hollow longitudinal shank member 10A.

The advantage of this modification is to provide a more secure installation where the device is less likely to work itself loose. It also prevents the warping or loosening of the weather boards due to vibration or natural warping of materials.

Figure 8:
FIG. 8 is a perspective view of a modified form of removable point.

A further modification of my fastener is shown in FIG. 8, wherein the pointed end 15B is wider in diameter than point 15 of FIG. 4, and is provided with a central recess 20 with bottom 28, and is made to fit over, rather than into, the inner end of the shank 10. The inner end of the shank 10 abuts or engages the bottom 28 of recess 20, and the pointed end 15B is then knocked out in the same manner after the fastener is inserted.

In all cases, the nails or screws should be of sufficient length to penetrate into the stud bay, or hollow wall area 25, to facilitate the movement of moisture vapor from the enclosed stud bay area or hollow wall to the ouside atmosphere. Likewise, this aerates the enclosed stud area or hollow wall 25 by permitting enough drying air to pass from the outside atmosphere to the hollow wall area to prevent dry rot and other damage to building members.

It will also be understood that the removable point 15A may be provided with screw threads, if desired, without departing from my invention.

It will be further understood that the removable points 15, 15A, and 15B may be loosely fitted onto the shank 10, so as to drop off when the fastener is driven through the hollow wall, without departing from my invention. But to be certain that the pointed end has dropped off, the positive method of inserting the rod to knock out the point is preferred.

It should be understood that the present disclosure is for the purpose of illustration only and that this invention includes all modifications and equivalents which fall within the scope of the appended claims.

I claim:

1. A ventilating sheathing fastener for a hollow building wall comprising a longitudinal tubular member having an apertured flanged head on its outer end, and a removable pointed end having means fitting it to the inner end of said tubular member, said pointed end being capable of being knocked inwardly from said inner end by a tool inserted through the aperture of the flanged head, to provide ventilation through said tubular member and head after the fastener is inserted in said wall.

2. A ventilated sheathing fastener according to claim 1, in which the removable pointed end has a shank of reduced diameter insertable in the inner end of said tubular member.

3. A ventilating sheathing fastener for a hollow building wall, comprising a longitudinal hollow tubular member having a continuous helical rib on its outer surface and a slotted flanged head on its outer end, and a removable pointed end, having means fitting it to the inner end of said tubular member, said pointed end being capable of being knocked inwardly from said inner end by a tool inserted through the aperture of the flanged head to provide ventilation through said tubular member after the nail is inserted in said wall.

4. A ventilating sheathing device for a hollow building wall according to claim 3 in which the removable pointed end has a shank of reduced diameter insertable in the inner end of said tubular member, and said shank has keys fitting slots in the inner end of the tubular member to rotate therewith while said device is being screwed into the wall.

5. A ventilating fastener for attaching weatherboards to a hollow building wall structure comprising an elongated shank adapted to penetrate through the weatherboards into the hollow wall area and having a flanged apertured head adapted to seat on the exterior side of the weatherboards, said fastener having a hollow core throughout its shank length and a removable point having means for attaching it to the inner end of said shank, said point being removable by being knocked inwardly from the inner end of said shank, thus presenting a continuous opening to afford a vent through the device from the interior of the hollow wall to the outside atmosphere.

6. A fastener for attaching weatherboards to a hollow building wall comprising a shank having an elongated hollow core adapted to penetrate through the weatherboards into the hollow wall, with a removable point on its inner end and an apertured flanged head on the other end, said head adapted to seat on the exterior side of the weatherboards, and said removable point having a post of reduced diameter at the opposite end from the point capable of being inserted into the hollow core of said shank part, thus forming integral parts capable of being fitted together and being driven into the wall structure members, and said pointed member being capable of being knocked out from said inner end after the device has been driven into the wall and seated, thus providing a continuous vent from the interior of the hollow wall to the outside atmosphere.

7. A fastener for attaching weatherboards to a hollow building wall structure according to claim 5 in which the elongated shank has a continuous helical screw thread on its outer surface.

8. A fastener according to claim 5 wherein the removable point has a post of reduced diameter with keys on opposite sides engaging slots formed in the inner end of said shank.

9. A fastener for attaching weatherboards to a hollow building wall comprising an elongated hollow shank, an apertured head on its outer end, and having a continuous helical screw thread on its outer surface and two opposed longitudinal slots on its inner end, and a separate removable point having a shank of reduced diameter and ribs thereon adapted to key with said slots so as to form integral parts fitted together and capable of rotating in unison when the device is being driven or screwed into the hollow wall area, and said point being capable of being knocked inwardly from the inner end of the shank, thus providing a continuous vent through the shank from the interior of the hollow wall to the outside atmosphere.

References Cited in the file of this patent

UNITED STATES PATENTS

| | | |
|---|---|---|
| 2,664,809 | Morell | Jan. 5, 1954 |
| 2,705,030 | Koffler | Mar. 29, 1955 |